Aug. 22, 1967  W. M. PAGE ET AL  3,337,002
AUTOMATIC LUBRICATING SYSTEMS
Filed April 24, 1964  6 Sheets-Sheet 5

INVENTORS
GEORGE KENNETH FARMERY
WILBUR MILLS PAGE
By: Morris + Bateman, Atty

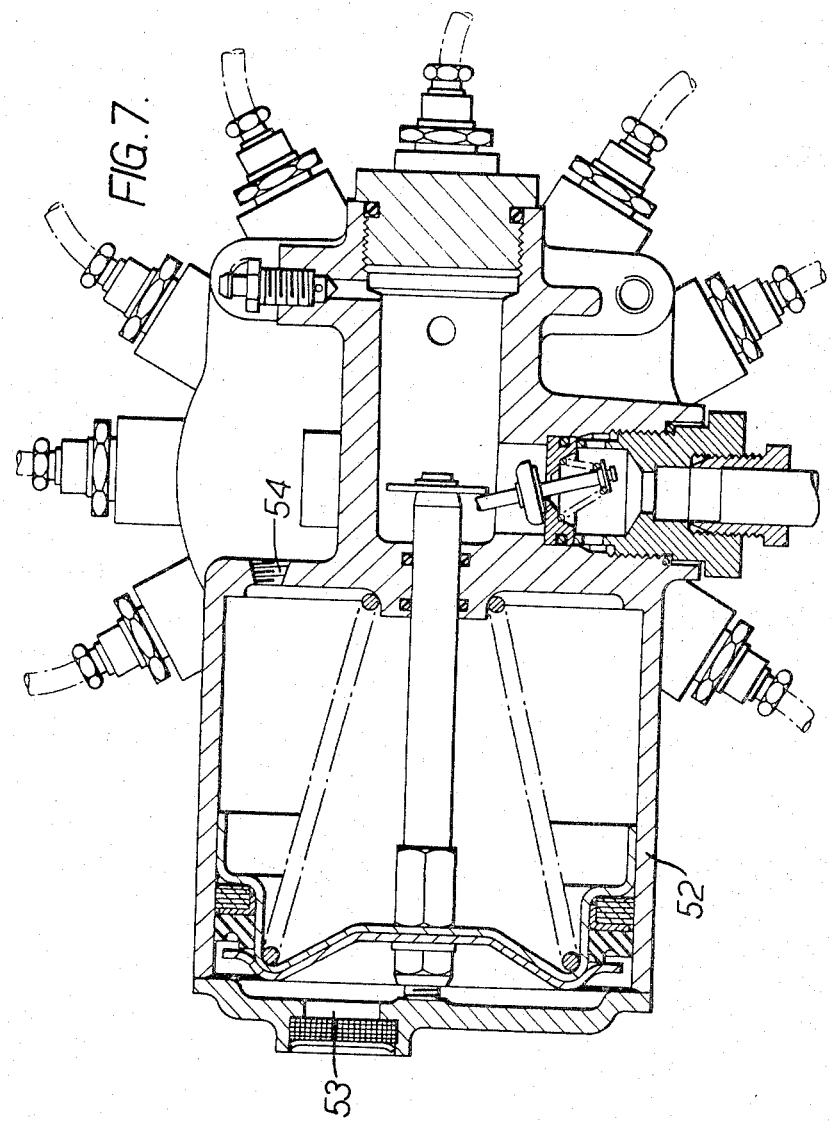

United States Patent Office 3,337,002
Patented Aug. 22, 1967

3,337,002
AUTOMATIC LUBRICATING SYSTEMS
Wilbur M. Page and George K. Farmery, Lincoln, England, assignors to Clayton Dewandre Company Limited, Lincoln, England
Filed Apr. 24, 1964, Ser. No. 362,364
12 Claims. (Cl. 184—6)

This invention relates to automatic lubricating systems as used on motor vehicles and other machinery for delivering lubricant intermittently and under pressure to a number of points on the vehicle chassis or machine frame, and has for its object the provision of a new or improved system of this character which has the features of being self-bleeding, of permitting easy variation or adjustment of the amount of lubricant delivered to any specific receiving point independently of the supply to other receiving points, of ensuring continued operation of the remainder of the system in the event of damage or blockage in part of the system leading to any one or more receiving points, and of permitting separate mounting on the vehicle or machine of the means for pressurizing the lubricant and the means for distributing the lubricant, if desired, so facilitating installation and the most practicable use of available space.

According to the invention the improved system comprises one or more distributing devices each consisting of a number of plunger-type pumping elements operable to deliver shots of lubricant through conduit connections to points to be lubricated, means for delivering lubricant directly from a reservoir or like source to the pump chambers of the pumping elements, and an intensifier device operable to deliver a separate flow of lubricant intermittently and under pressure to the distributing device or devices for the purpose of actuating the pumping elements.

Figure 1:
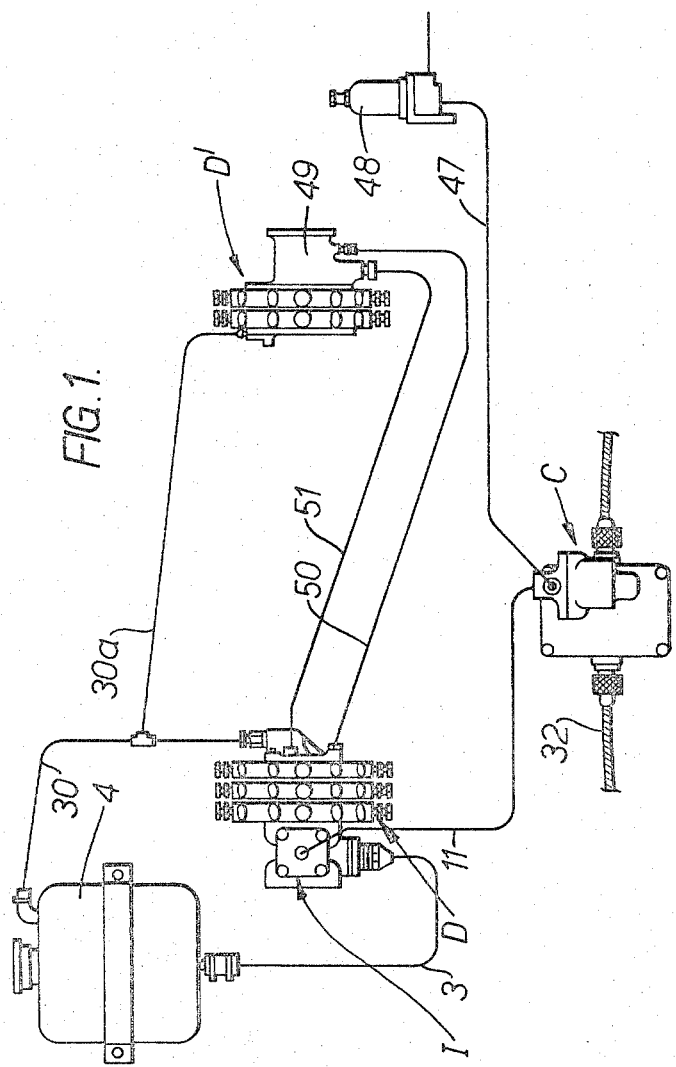
Figure 2:
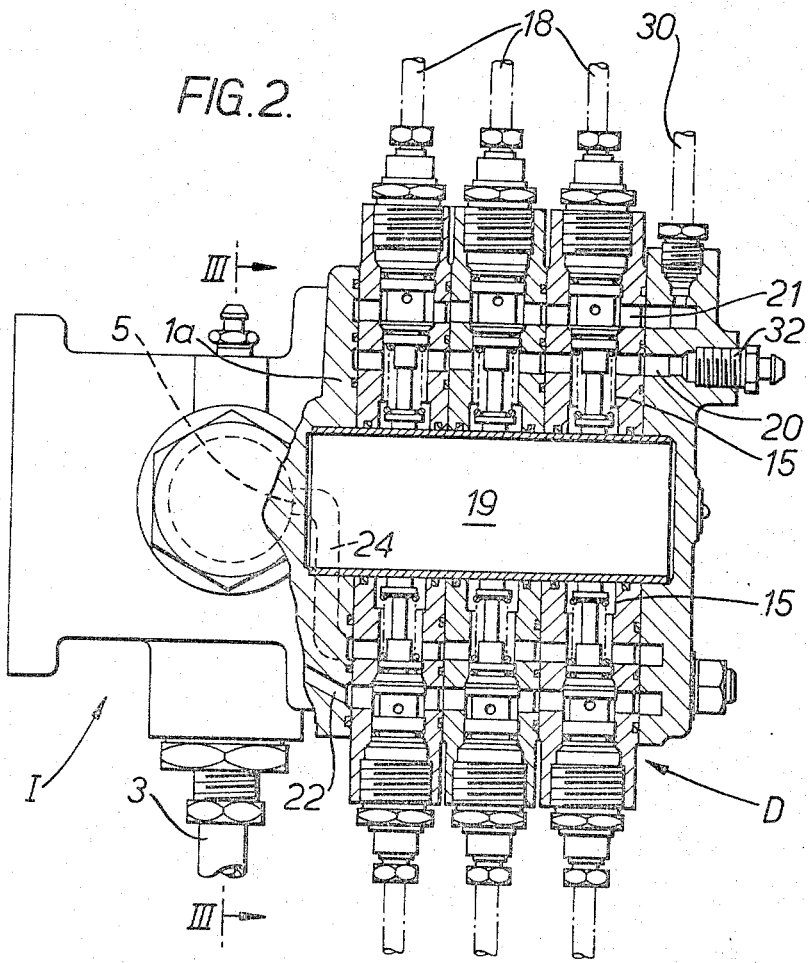
Figure 3:
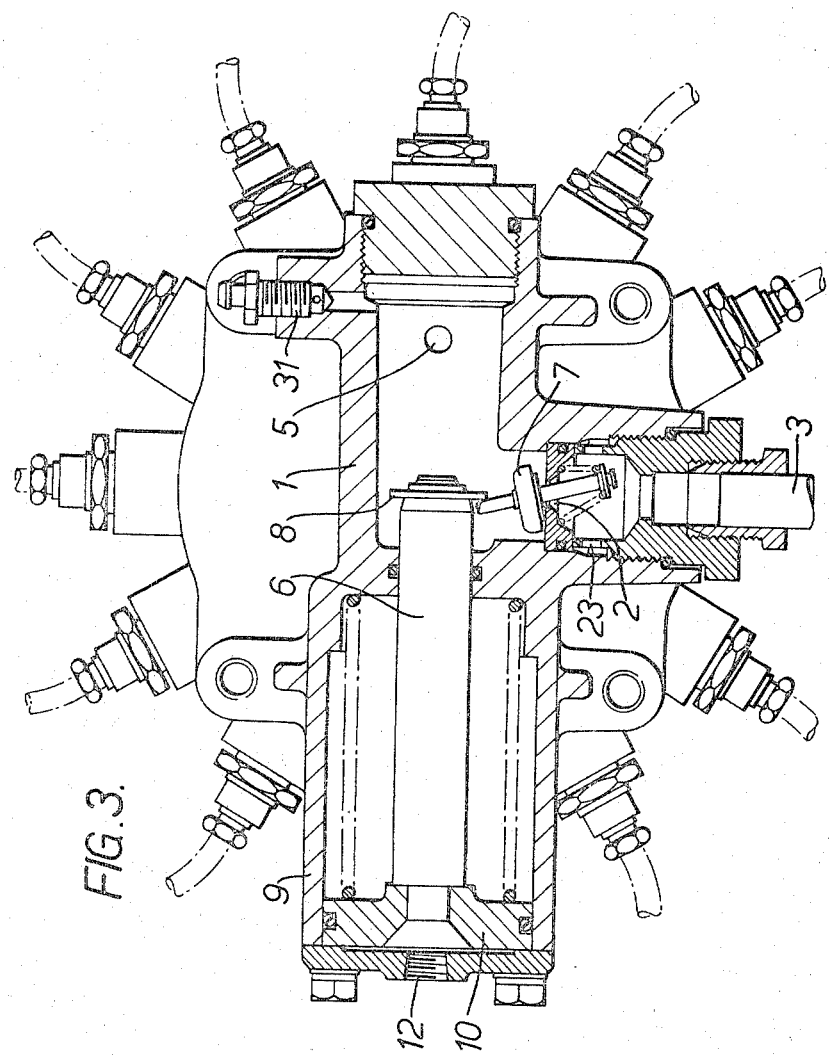
Figure 4:
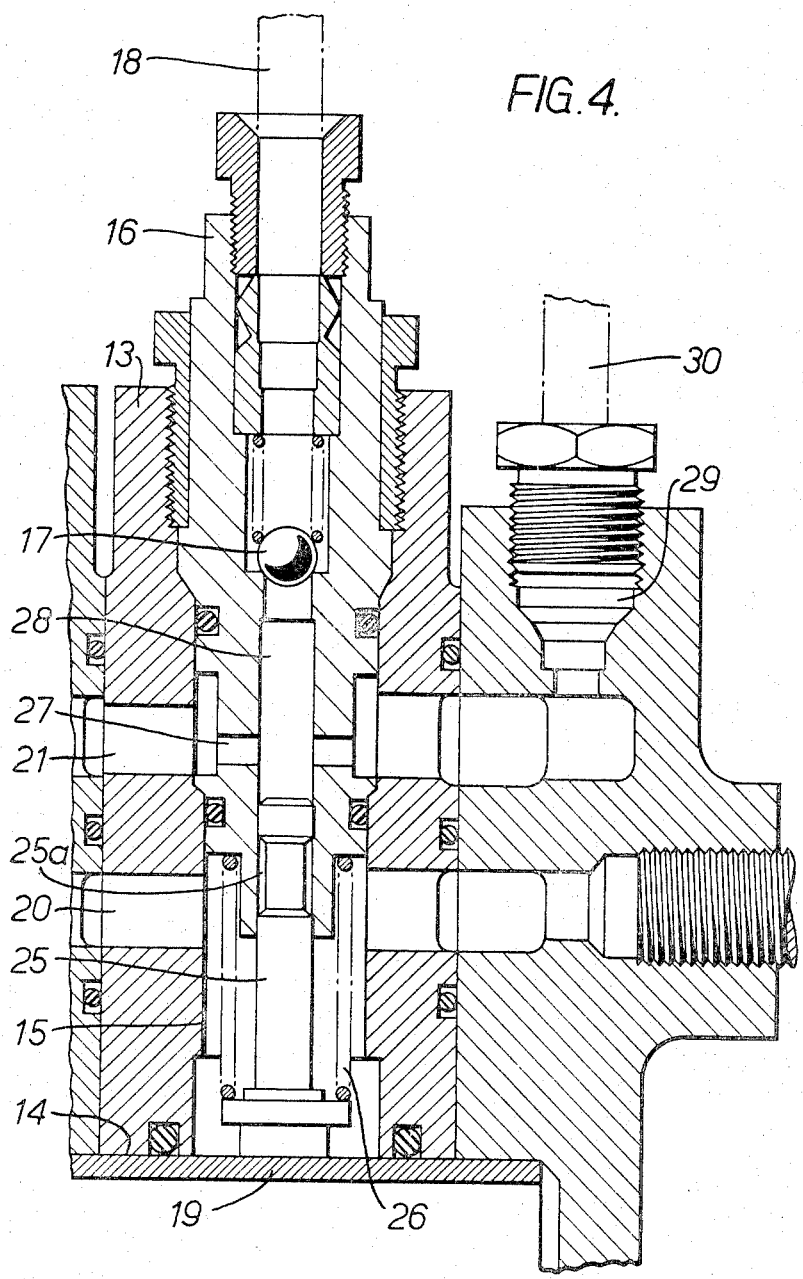
Figure 5:
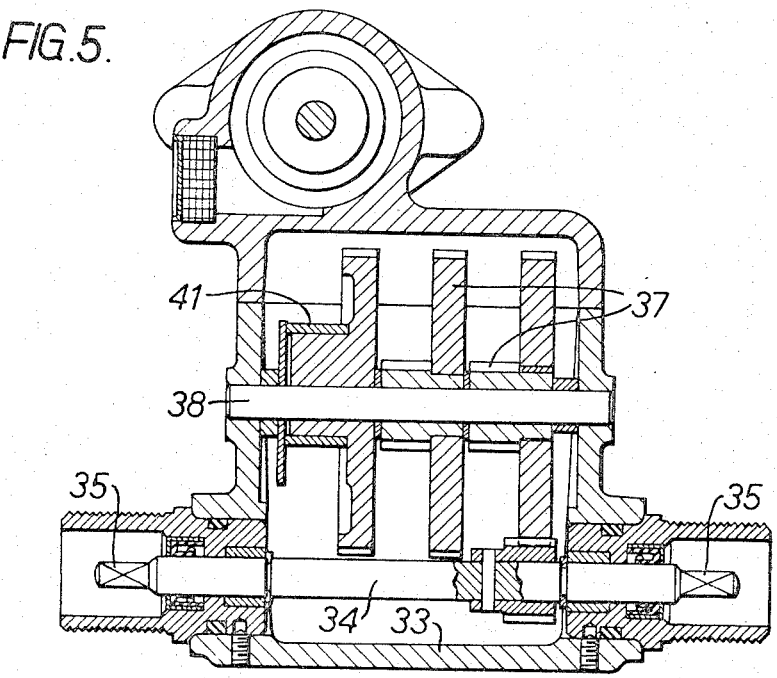
Figure 6:
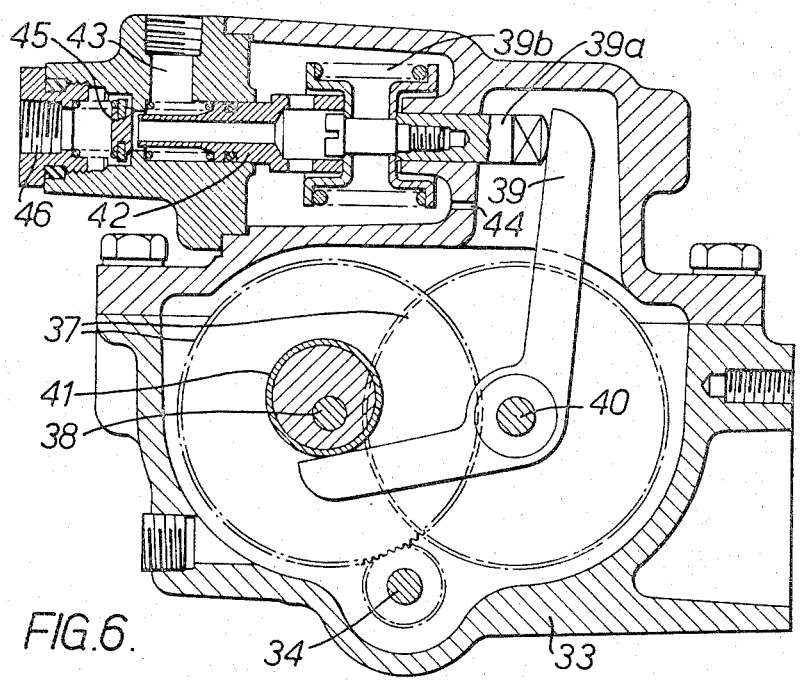

Preferably, the intensifier device is actuated by a fluid pressure motor controlled by means responsive to running time of the machine or distance travelled by the vehicle, whilst the distributing devices are so formed that they may be mounted directly on the motor-driven intensifier, if desired, to form a unitary structure therewith, and the invention will be more fully understood from the following description of one such embodiment constructed as a multipoint lubricator for a vehicle chassis and which is illustrated in the accompanying drawings wherein:

FIG. 1 is a diagrammatic view of the complete system,
FIG. 2 is a part-sectional elevation of the distributor/intensifier unit,
FIG. 3 is an axial sectional view taken on the line III—III of FIG. 2,
FIG. 4 is an axial section to an enlarged scale through one of the pump assemblies of the distributing device,
FIG. 5 is a longitudinal sectional view through a control unit for the motor of the intensifier,
FIG. 6 is a cross sectional view through the unit of FIG. 5, and
FIG. 7 is a view similar to FIG. 3 but showing an alternative form of intensifier motor.

Referring first to FIGS. 1–4, it will be seen that the intensifier I has the form of a hydraulic displacement device comprising a cylinder 1 having a valve-controlled inlet port 2 at one end connected by conduit 3 to a lubricating oil reservoir 4, and an outlet port 5 near the other end connected to the distributing devices D, and a plunger-like displacement member 6 movable axially of the cylinder to deliver oil under pressure therefrom. The valve 7 controlling the inlet port is of the spring-loaded tilting type which is held off its seating by an abutment 8 on the plunger when the latter is in the fully retracted position as shown, and automatically closes to seal off the cylinder from the reservoir as the plunger commences an operative stroke. The displacement plunger is actuated by a piston and cylinder type motor 9 which in this instance is of the air pressure type, the motor cylinder being axially aligned with and preferably integral with the cylinder 1 of the intensifier and the motor piston 10 being fixedly mounted on the displacement plunger 6 which extends through the wall separating the two cylinders. Supply of air to actuate the motor is controlled by means hereafter described, the air being delivered under pressure and through conduit 11 to a port 12 in the outer end wall of the motor cylinder and the other end of said cylinder being permanently vented to the atmosphere.

In the construction illustrated a series of distributing devices D is mounted in association with the intensifier, said devices having opposed flat faces so that they can be bolted in side by side relation upon a side face of said intensifier. Each distributing device comprises an annular body portion 13 formed with an axial bore 14, a series of stepped radial bores 15 spaced around and extending outwardly from the axial bore, and a tubular fitting 16 located in the outer end portion of each radial bore, which fitting embodies a spring-loaded non-return valve 17 and is formed to receive the end of a small bore conduit 18 by which the fitting is connected to a point to be lubricated. A hollow tube 19 extending with close fit through the axial bores of the several aligned distributing devices and into a socket in a flange 1a on the intensifier cylinder serves to assist in locating the distributing devices upon the intensifier whilst also closing the inner ends of the radial bores.

Formed in the body portion 13 of each distributing device are two annular series of transversely-extending ports 20, 21 which open into the radial bore 15 and which are coincident with like ports in adjacent distributing devices, the outer series of ports 21 being connected by a passage 22 in the cylinder 1 with ports 23 in the seating member of valve 7 such that the ports 21 are permanently connected to the reservoir, whilst the inner series of ports 21 are connected by another passage 24 with the cylinder outlet port 5. Disposed axially of each radial bore 15 and movable in the bore of the fitting 16 is a pumping plunger 25 which is normally urged by a spring 26 to the innermost position as shown where its inner end abuts the tube 19. When in this position, the outer end of the plunger is disposed inward of a series of lateral ports 27 formed in the fitting 16 and communicating permanently with the ports 21.

Normally, the radial bores 15, the spaces 28 above the plungers and which constitute the pump chambers, the two series of ports 20, 21 and all conduit connections are fully charged with lubricant and thus when the intensifier operates to deliver lubricant under pressure to the inner ends of bores 15, the plungers 25 are forced outwards, first masking the ports 27 and thereafter discharging lubricant past the valves 17 into the distributing conduits 18. It will be seen that the amount of lubricant delivered at each actuation of a pump plunger is determined by the degree of travel of the plunger after it has masked the ports 27. Thus in order to vary or regulate the amount of lubricant discharged at each actuation, several fittings 16 having the ports 27 at different axial positions may be provided for selective use, said fittings preferably incorporating externally-visible markings indicating the related volumetric delivery. Similarly results could be obtained by using variable or interchangeable abutments to determine the stroke of the plunger or by selective use of plungers of different lengths.

With the control of the intensifier as herein employed, the plungers remain under high pressure for a relatively long time, and provision has to be made, particularly if commercial working clearances are adopted, to prevent lubricant being forced past the plungers and so varying the quantity delivered. This is achieved in the present instance by relieving the plungers at a short distance inward of their outer end and as shown at 25a such that when the plunger completes an operative stroke, the relieved part 25a is exposed to the cross ports 21 and any lubricant under pressure from the intensifier which reaches the relieved portion merely escapes to the supply line from the reservoir and is not additive to the delivered shot of lubricant.

An important feature of the system above described is that it is self-bleeding after the initial installation. It will be seen that lubricant enters the intensifier at the underside, i.e. is lowest point, and also enters the annuli of ports 20, 21 at their lowest points such that lubricant flows upwards during operation of the system expelling any air in the system through an upper vent pipe connection 29 communicating by way of a conduit 30 with the upper end of reservoir 4. Bleed valves 31, 32 at the upper side of intensifier housing 1 and at the uppermost point of the port annuli 20 respectively ensure escape of air during charging of the system.

In the arrangement shown, the air pressure motor 9 is adapted to be actuated at set intervals of distance travelled and for this purpose there is provided the control unit C shown in detail in FIGS. 5 and 6 and comprising a housing 33 supporting a drive shaft 34 embodying coupling means 35 at its ends by which it is interposed in the vehicle speedometer drive 36, see FIG. 1, reduction gearing 37 for driving a layshaft 38 from said drive shaft, and a bell crank lever 39 supported on an auxiliary shaft 40 and adapted to be rocked intermittently by a cam 41 on the layshaft and to actuate through plunger 39a a hollow air valve element 42. The element 42 normally connects a port 43 connected by conduit 11 with the air motor 9 to atmosphere through the bore of the element and a port 44 but, for a short period during each rotation of the layshaft, the valve element is displaced and engages a spring-loaded disc valve 45 to close the atmospheric connection and also to lift the disc valve from its seating and connect port 43 to a port 46 to which compressed air is supplied through a conduit 47 embodying a regulating valve 48.

In order to be able to use commercial fit plungers in the oil distributor elements, as against individually lapped plungers, it is necessary that pressure in the intensifier be built up as rapidly as possible to prevent fluid loss past the plungers and so maintain an accurately metered delivery of oil to the chassis point.

It will be appreciated that at low vehicle speeds the rotational speed of the valve-operating lever cam 41 will be very slow because of the high velocity ratio of the reduction gear 37. In order to provide a snap application of the air valve 42, a spring 39b is interposed between the operating plunger 39a and the valve element, so that when the load built up in this spring equals the valve head load, the valve will snap over giving a quick feed of air to the intensifier piston with a consequent rapid build up of hydraulic pressure at the element plungers.

The operation of the lubricant distribution system is apparent from the foregoing description. Piston 10, which is reciprocated under the control of air pressure from unit C, displaces lubricant from cylinder 1 through port 5, passage 24, and port 20 to displace each of the plungers 25 upwardly as viewed from FIGURE 4. Each pumping chamber 28, which is in constant fluid communication with the lubricant reservoir through ports 27 and 21, passage 22, port 23, and conduit 3, is filled with lubricant which is displaced out through non-return valve 17 and conduit 18 upon the intensifier-actuated plunger displacement mentioned above. All of the ports 20 are connected together, as are all of the ports 21, so that all of the distributor pumps are operated by the single intensifier.

The apparatus as above described is capable of various modifications. FIG. 1 includes an arrangement wherein additional distributing devices $D^I$ are actuated by a remotely-situated slave unit 49 having only a hydraulic connection with the main intensifier and distributor device assembly, i.e. conduits, 50, 51 connecting the port annuli 20, 21 respectively with the corresponding ports of the slave unit assembly and a vent pipe connection 30a to the vent pipe 30. If desired, individual distributing devices may be separately mounted at desired points on the chassis or machine frame with corresponding intensifier and reservoir connections whilst the control unit may alternatively be driven from the gearbox or other point in the vehicle transmission. It is also possible to use vacuum operation instead of air operation of the intensifier. FIG. 7 shows such a construction, embodying a larger diameter piston and cylinder type motor 52, one end thereof being permanently connected to atmosphere by port 53 whilst a port 54 at the other end of cylinder is connected in use to a source of vacuum under the equivalent of the control valve C.

We claim:
1. An automatic lubricating system for motor vehicles and the like comprising means defining a reservoir of fluid lubricant, lubricant distribution means comprising a pumping chamber having an outlet connected to a device to be lubricated and an inlet connected to said reservoir, a pumping element movable in said chamber, and means for actuating said pumping element in a pumping cycle comprising intensifier means for periodically applying lubricant from said reservoir under increased pressure to said pumping element for periodically displacing said pumping element in a direction for pumping lubricant out of said chamber through said outlet, said intensifier means and said inlet having separate connections to said reservoir whereby flow of lubricant to said pumping chamber bypasses said intensifier means.

2. In the automatic lubricating system defined in claim 1, said intensifier means comprising means defining a second chamber having an inlet connected to said reservoir and an outlet connected to a third chamber in said distribution means wherein fluid lubricant is applied to said pumping element, a fluid pressure responsive member movable in said second chamber, and fluid pressure means for cyclically actuating said member for periodically increasing the lubricant pressure in said second and third chambers.

3. In the automatic lubrication system defined in claim 2, said fluid pressure responsive member being a reciprocable piston, a valve in the inlet to said second chamber normally biased to closed position, and means on the piston for opening said valve when the piston is in the limit position preceding movement in the pressure increasing direction.

4. In the automatic lubricating system defined in claim 1, said pumping element being a plunger reciprocable in said pumping chamber, and said intensifier means comprising a further chamber containing an end of the plunger projecting from said pumping chamber and connected to receive said lubricant under pressure.

5. In the automatic lubricating system defined in claim 4, means on said plunger effective after predetermined displacement in said pumping direction for closing said pumping chamber inlet.

6. In the automatic lubricating system defined in claim 5, said pumping chamber inlet comprising a port that is closed by the leading end of said plunger after said predetermined displacement, and means providing a relieved section of said plunger that communicates with said port after the plunger leading end has passed said port during said displacement.

7. In the automatic lubricating system defined in claim 1, there being a plurality of said lubricant distribution means, with the pumping chambers of all of them in fluid communication, and with said intensifier means connected to apply lubricant under pressure to pumping elements at all of said pumping chambers.

8. In the automatic lubrication system defined in claim 1, said intensifier means comprising a cylinder containing a piston and having its inlet connected to said reservoir and its outlet connected to a pressure chamber for applying lubricant to said pumping element, and said actuating means comprising control means for periodically applying fluid under pressure to said intensifier cylinder for displacing said piston in a direction to pressurize said lubricant.

9. In the automatic lubrication system defined in claim 8, said control means comprising a valve assembly interposed between a source of fluid pressure and said intensifier cylinder and containing means for periodically opening and closing the valve.

10. In the automatic lubrication means defined in claim 9, means in said valve assembly for varying the periodicity of valve opening and closing.

11. In the automatic lubrication system defined in claim 1, said intensifier means comprising a housing having aligned chambers separated by an internal wall, one of said chambers being a cylinder in said actuating means and containing a reciprocable piston that projects through said wall into the other chamber, said one chamber being connected to means for periodically applying fluid under pressure to said cylinder for reciprocating the piston, and said other chamber having an inlet connected to the reservoir and an outlet connected to apply lubricant under piston pressure to said pumping element.

12. An automatic lubricating system for motor vehicles and the like comprising a reservoir of fluid lubricant, lubricant distribution means comprising a pumping chamber having an inlet port and an outlet port, first fluid flow passage means connecting said inlet port to said reservoir to transmit reservoir lubricant to said pumping chamber, means connecting said outlet port to a device to be lubricated, a pumping element movable in said chamber, means for actuating said pumping element in a pumping cycle comprising intensifier means having an inlet connected to said reservoir and an outlet, and second fluid flow passage means connecting the outlet of said intensifier means to said lubricant distribution means, said intensifier means being operable to apply reservoir lubricant under increased pressure to said pumping element for displacing said pumping element in a direction for pumping lubricant in said chamber through said outlet port, said first and second passage means being formed separately of each other and said inlet port being connected to said reservoir separately from the intensifier means inlet to enable the reservoir lubricant to be delivered to said pumping chamber without being transmitted through said intensifier means.

References Cited

UNITED STATES PATENTS

| 1,931,894 | 10/1933 | Gill | 184—29 |
| 1,992,052 | 2/1935 | Bizzarri | 222—262 |
| 2,122,177 | 6/1938 | Klein | 184—7 |
| 2,141,022 | 12/1938 | Rotter | 184—39 X |
| 2,206,335 | 7/1940 | Rotter et al. | 184—7 |
| 2,725,119 | 11/1955 | Edge et al. | 184—7 |
| 3,013,633 | 12/1961 | Rotter | 184—7 |
| 3,134,508 | 5/1964 | Bayer et al. | 222—263 X |
| 3,144,096 | 8/1964 | Rotter | 184—7 |

LAVERNE D. GEIGER, *Primary Examiner.*

E. J. EARLS, *Assistant Examiner.*